D. W. & S. A. SHULER.
SUSPENSION SPRING.
APPLICATION FILED SEPT. 1, 1915.
1,198,783.                                          Patented Sept. 19, 1916.
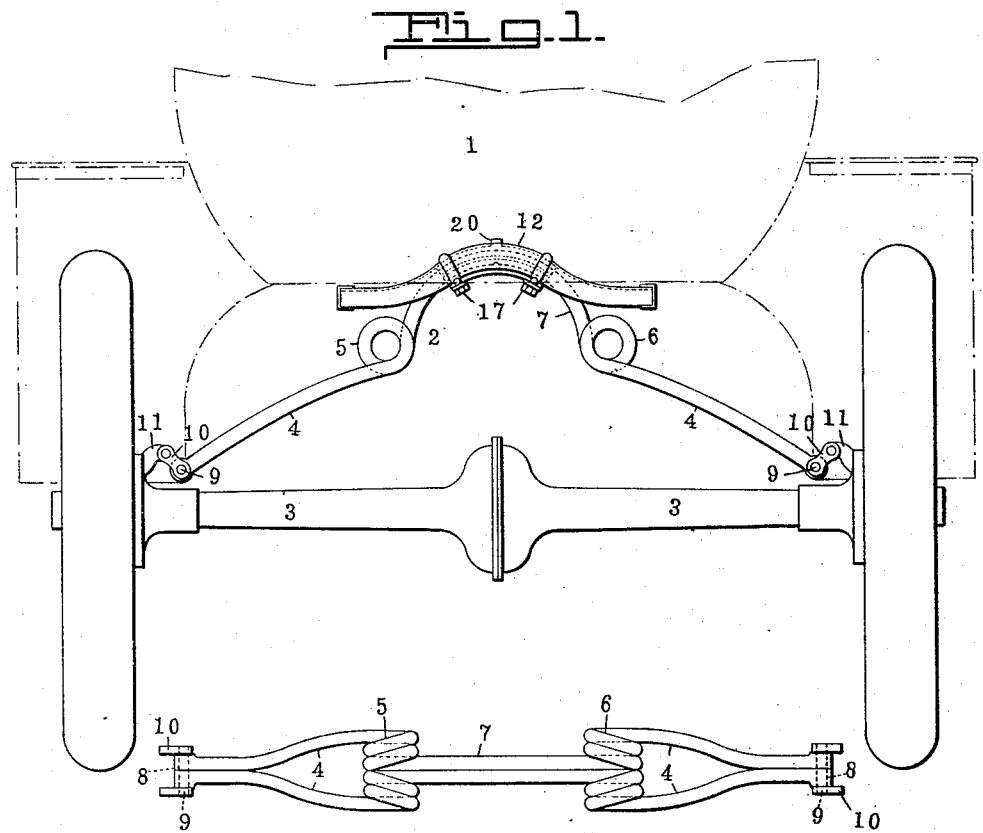
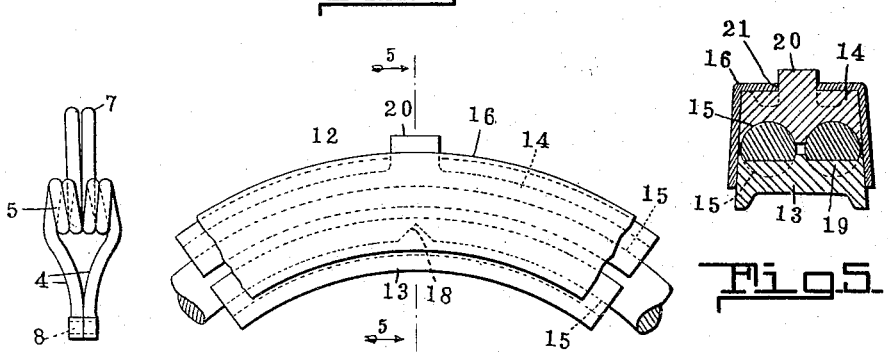
WITNESSES                                           INVENTORS.

UNITED STATES PATENT OFFICE.

DAVIS W. SHULER AND SANFORD A. SHULER, OF AMSTERDAM, NEW YORK.

SUSPENSION-SPRING.

1,198,783.

Specification of Letters Patent.

Patented Sept. 19, 1916.

Application filed September 1, 1915. Serial No. 48,416.

*To all whom it may concern:*

Be it known that we, DAVIS W. SHULER and SANFORD A. SHULER, citizens of the United States, residing at Amsterdam, in the county of Montgomery and State of New York, have invented certain new and useful Improvements in Suspension-Springs, of which the following is a full, clear, and exact description, such as will enable others skilled in the art to which it appertains to make and use the same.

This invention relates to suspension springs and more particularly to such springs for automobiles and other vehicles.

One of the objects of the invention is to provide an improved suspension spring which is of increased efficiency and durability and which is simple in construction, light in weight, and cheap to manufacture.

Another object is to provide an improved vehicle spring which minimizes the transmission of vertical and lateral shock displacements from the wheels to the frame and which otherwise insures a desirable easy riding quality in the vehicle.

Another object is to provide a reliable spring for the purpose set forth which operates without noise or friction and wherein torsional strain is substantially eliminated.

A further object is the provision of an improved spring capable of modification and application to various uses and possessing numerous features of functional advantage and structural superiority.

Other objects and advantages will in part appear hereinafter and in connection with a description of the accompanying drawing which illustrates an exemplary embodiment of the invention.

In the drawing, Figure 1 is a rear elevational view of our improved spring applied to a motor vehicle; Fig. 2 is a top plan view of the spring; Fig. 3 is an end view thereof; Fig. 4 is an enlarged fragmentary view of the spring clamp; and Fig. 5 is a sectional view on the line 5—5 of Fig. 4.

Referring more specifically to the drawing, there is indicated a supported part 1, here typically represented as an automobile body, resiliently carried by suspension springs 2 attached to supporting parts 3, here typically represented as a rear axle and wheels. The spring 2, as shown, comprises two juxtaposed bars of proper spring steel correspondingly bent to provide curved, bowed, or semi-elliptical end arms 4 of equal length which are coiled reversely at 5 and 6 and thence arched together into a central load-bearing portion 7. The particular curve or shape of arms 4 and arch 7 is capable of variation, in practice, to meet predetermined requirements. The length of each arm 4 may be, *e. g.* about one-third the total span of the spring and the coils 5 and 6 may include two and a quarter turns so that the arms 4 tangent the coils at the lower sides thereof and the arch 7 tangents the coils at the inner sides. It may be stated, however, that the size and number of turns and relative location of the coils may be altered in practice to meet different requirements of service. Furthermore, the coils may be of other shapes than circular, for example, oval, elliptical or spiral. It is also to be noted that the cross-sectional shape of the bars, or any portion thereof, may be round or square or otherwise varied and that the plane of the coils, while preferably vertical or in the longitudinal plane of the arch of the spring, may be offset or disposed at other relative angles. The springs may also, if desired, be tapered toward their ends from any desired point in the spring or otherwise varied in size to insure the requisite degrees of resiliency and strength. The compactness and efficiency of the spring is further augmented, as shown in Figs. 2 and 3, by bowing the arms 4 apart toward the coils and turning the latter inward, or toward each other, so that the bars of central arch 7 are juxtaposed and straight in the vertical plane.

The means of attaching the springs to supporting and supported parts may be varied in accordance with the particular installation. As shown, the extremities of arms 4 are provided with registering apertures 8 to receive bolts 9 of shackles 10 pivotally mounted on axle brackets 11. The outer extremities of the spring bars are thus alined and held against relative displacement. The arch 7 of the spring is reinforced and gripped by a clamping device 12 which also serves as a bracket for attachment to the load. This device 12 comprises a pair of complementary arcuate jaws or clamps 13 and 14 having adjacent grooves 15 to receive the spring bars. An arcuate cover 16 fits over the top and sides of the clamps 13 and 14, and a plurality of U-bolts 17 encircle the device and hold the parts together. Preferably also the depth and shape of grooves 15 is such that the spring bars are wedged in position when the clamp is tightened. In order to further eliminate the possibility of longitudinal creeping or end thrust, the spring bars are also notched at 18 to nest with V-shaped lugs 19 in the grooves of clamp 13. The upper clamp 14 is also provided with an upstanding lug 20 which passes through an aperture 21 in the plate 16 and is adapted to seat in a corresponding recess in the frame of the vehicle or other load. The above described clamping member is made sufficiently long to prevent tendency to strain, and possible breakage when load is applied to the spring. If necessary, the bearings of the clamping device may be formed of different curvature, so that when the parts of the bearing are pulled together, the spring is held more securely. This construction further tends to eliminate the possibility of breakage.

The operation of the suspension device described is substantially as follows: The coils 5 and 6, due to their form and to the relatively long leverage of the arms 4, act to take up or absorb the major part of all jolts and shocks. Moreover, the coils permanently retain their resiliency and, on account of the quick response thereof, tend to substantially preclude any crystallization of the spring metal with its attendant danger. The bowed arms 4 at the same time act in the manner of ordinary semi-elliptic springs, though in addition the coöperative action of the arms and coils together serves to enhance the flexibility of the spring and to prevent the permanent distortion of any part. It is also to be noted that the coils act to absorb lateral as well as vertical shocks so that side sway and similar objectionable characteristics of such, for example, as leaf springs, are overcome. The lateral spacing of arms 4, with the fixed extremities and center in transverse alinement, as described, also reinforces the spring against right-angled strains.

The range of flexibility of the springs is also advantageous. That is, the coils 5 and 6 permit a resiliency even though the bowed arms 4 are extended to the fixed limits of the shackles 10, and accordingly liability of buckling is nullified. It is to be noted, however, that elongation of the spring in operation is substantially prevented by the coils which contract under load and thereby tend to compensate for straightening of the bow. The installation of the spring is thus greatly facilitated since it may be applied without flexing. As the spring bars are designed to normally support their load without undue flexing, it will also be observed that the rebound is minimized, the coils winding and unwinding against substantially equal forces, and without friction or noise.

While each complete spring preferably comprises two integral units arranged as described, it is to be understood that under certain conditions a single bar spring, or more than two bars, may be used. When a plurality of the bars are juxtaposed, as shown, they may be readily repaired, in case of breakage of any bar, by wiring the broken parts to the remaining bars. It is further to be understood that our invention may be embodied in full elliptic, cantaliver and other types of springs and may be mounted in any relation to the load and the support without departure from the scope thereof and without sacrifice of the inherent merits.

Having described our invention, what we claim as new and desire to secure by Letters Patent, is:

1. A vehicle suspension spring comprising a pair of bar springs, each formed with a central portion contiguous to the central portion of the other and laterally extending coils wound so as to contract under load, the ends of said springs extending in alinement with said central portions, whereby twisting strains in said springs are eliminated.

2. In a resilient suspension device for vehicles, in combination, a plurality of bar springs having juxtaposed central portions, means for clamping said central portions together, coils formed in said springs beyond said clamping means, and so related to the remaining portions of said springs as to contract under load, and downwardly extending portions of said springs having contiguous extremities in alinement with said central portions, whereby twisting strains in said springs are eliminated.

3. In a resilient suspension device for vehicles, a plurality of juxtaposed bar springs, each having medial coils wound in a direction to contract under load and having alined ends for attachment to a supported part.

4. A suspension bar spring having curved extremities for attachment to a supporting member, an arched central portion for attachment to a supported member, and a plurality of coils intermediate of said extremities and said central portion, said extremities and said central portion merging into said coils at substantially right angles.

5. In a resilient suspension device, in combination, two bar springs having contiguous extremities, curved arms diverging upward from said extremities and coiled laterally inward, and contiguous center portions.

6. In vehicle suspension, in combination, a bar spring having medial coils and a central connecting portion, and clamping means to secure said spring to a supported member, said means including a part to interlock with said connecting portion for holding said spring against longitudinal creeping.

7. In vehicle suspension, in combination, a plurality of unitary bar springs correspondingly bent to provide contiguous extremities, spaced medial coils and contiguous central arches, attaching means for clamping said springs together at said extremities, and attaching means for wedging and locking said arches together.

8. In vehicle suspension, in combination, a plurality of unitary bar springs correspondingly bent to provide contiguous extremities, spaced medial coils and contiguous central arches, attaching means for clamping said springs together at said extremities, attaching means for wedging and locking said arches together, and means for preventing creeping of said arches with respect to said attaching means.

9. In a resilient suspension device for vehicles, two juxtaposed transversely alined bar springs having contiguous extremities, curved arms diverging outward and thence coiling laterally inward, and contiguous central arches.

10. In a resilient suspension device for vehicles, two juxtaposed transversely alined bar springs having contiguous extremities, curved arms diverging outward and thence coiling laterally inward, and contiguous central arches, said extremities and said arches being longitudinally alined.

11. In a resilient suspension device for vehicles, two juxtaposed transversely alined bar springs having contiguous extremities, curved arms diverging outward and thence coiling laterally inward, and contiguous central arches, said extremities and said arches being longitudinally alined, and the parts of said springs constituting a portion of said coils, said arms and said extremities being tapered toward said extremities.

12. In a resilient suspension device for vehicles, a plurality of bar springs formed with juxtaposed central portions in the form of arches, laterally extending coils and downwardly inclined extremities, the portions of said arches adjacent said coils being substantially at right angles to the portions of said extremities adjacent said coils.

In testimony whereof we affix our signatures in the presence of two witnesses.

DAVIS W. SHULER.
SANFORD A. SHULER.

Witnesses:
  THOS. F. McCAFFREY,
  JOHN G. T. SWAN.

Copies of this patent may be obtained for five cents each, by addressing the "Commissioner of Patents, Washington, D. C."